United States Patent Office 3,060,156
Patented Oct. 23, 1962

3,060,156
POLYMERIC SULFONIUM SALTS
John H. Rassweiler, Greenwich, and David R. Sexsmith, Stamford, Conn., assignors to American Cyanamid Company, New York, N.Y., a corporation of Maine
No Drawing. Filed Dec. 1, 1959, Ser. No. 856,364
6 Claims. (Cl. 260—79)

This invention relates to water-soluble copolymers containing ternary sulfonium salt groups. More particularly, this invention is directed to novel aqueous-soluble copolymeric compositions obtained by reacting a copolymer of ar-substituted haloalkyl styrenes and an acrylamido monomer with certain di-substituted sulfides.

The linear chain copolymers of the invention are thermoplastic resinous polymerization products consisting essentially of two different types of monomers. The first or hydrophobic type, which is preferably employed in minor amounts, i.e., less than 50% by weight, is a monoethylenically unsaturated monomer containing a $CH_2=C<$ or vinyl group having attached thereto an aromatic hydrophobic substituent capable of imparting water repellency to hydrophilic surfaces. The hydrophobic substituents consist more specifically of an aromatic ring containing thereon, as an essential part, a halogenated alkyl radical. The monomers of the second type, the acrylamido monomers, are also monoethylenically unsaturated compounds capable of copolymerizing with those of the first type through a $CH_2=C<$ group but are, as distinguished from the first type, essentially hydrophilic. The invention is particularly concerned with the advantages afforded by subsequent treatment with organic sulfides of the copolymerization product of these two specific types of monomers, but it will be understood that other copolymerizable compounds may also be present in minor amounts of up to about 15% of the weight of the copolymer in some cases.

A variety of organic copolymers containing one or more hydrophobic group may be used. Typical among this first type of monomers are polymerizable compounds represented by the formula

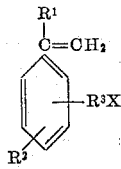

wherein $R^1$ and $R^2$ are substituents selected from the group consisting of hydrogen, halogen, methyl and ethyl radicals, $R^3$ is a substituent selected from the group consisting of methylene and ethylene radicals, and X is a halogen atom. Examples of this type of compound are such as ar-(chloromethyl)styrene, ar-(1-chloroethyl) styrene, ar-(bromomethyl)styrene, ar-(1-bromoethyl) styrene, p-chloro-ar-(chloromethyl)styrene, ar-methyl-ar-bromomethylstyrene, ar-ethyl-ar-chloromethylstyrene, ar-methyl-ar-chloromethylstyrene, p - chloro-ar-(1 - chloroethyl)styrene, α-methyl ar-(1-chloroethyl)styrene, p-bromo - ar(chloromethyl)styrene, α - methyl - ar(chloromethyl)styrene, and the like.

Examples of the acrylamido, or second type compounds which are employed in the preparation of copolymers with which the invention is specifically concerned are compounds of the general formula

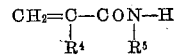

wherein $R^4$ is a substituent selected from the group consisting of hydrogen, halogen and methyl radicals and $R^5$ is a substituent selected from the group consisting of hydrogen and alkyl radicals of 1–20 carbon atoms. Suitable compounds of this type are such as acrylamide, methacrylamide, α-chloroacrylamide, α-bromoacrylamide, and the N-substituted alkyl derivatives such as N-methylacrylamide, N-ethylacrylamide, N-propylacrylamide, N-t-butylacrylamide, N-dodecylacrylamide, and the like.

The relative mole ratios of the copolymerizable components may vary from about 1 to 95 mole percent of the vinyl aromatic monomers and from about 99 to about 5 mole percent of the acrylamido monomers and preferably a mole ratio of vinyl aromatic to acrylamido monomer in the range of 1:99 to about 40:60, respectively.

It is understood that within the scope of the invention mixtures or blends of the monomers of the first type may be copolymerized with mixtures or blends of monomers of the second type.

It may be desirable to modify these copolymers by the addition of up to about 15% of a third and different polymerizable monomer during the copolymerization reaction. Suitable compounds are the polymerizable monomers containing a $CH_2=C<$ group. Exemplary of such monomers are vinyl chloride and vinylidene chloride; the vinyl esters, such as vinyl acetate, ethyl acrylate, ethyl methacrylate, methyl methacrylate, etc. and conjugated diolefins, such as butadiene, isoprene, chloroprene, 2,3-dimethyl butadiene, and the like.

The optimum proportions of the copolymerizable compound depend on the particular application. It will be apparent that the copolymer, prior to conversion of the haloalkyl groups on the aromatic ring, is soluble where it contains a proportion, i.e., about 60% or more, of the water-soluble acrylamido compound to offset the hydrophobic character of the vinyl aromatic component. Where the copolymer is insoluble in water, the formation of the sulfonium salt effects water-solubility. In either case, the product is water-soluble; the reaction of the copolymer with the organic sulfide converts the non-ionic nature of the copolymer to a novel product which is cationic and substantive to cellulose. When the resin is so conditioned it is selectively adsorbed or absorbed by the cellulose fibers from a dilute aqueous solution or dispersion thereof, containing these fibers, in amounts much greater than those corresponding to the concentration of resin in the solution or to what would be contained in the water normally left in the sheet after forming.

The copolymerization of the vinyl aromatic compound containing the alkyl halogen radical and the acrylamido compound can be effected by any of the procedures known to be suitable for polymerizing vinyl compounds. Thus thermal or ultraviolet light polymerization may be employed. Preferably a small quantity, on the order of 0.1% to 2% on the weight of the monomers, of a suitable polymerization initiator, such as azobisisobutyronitrile, benzoyl peroxide, cumene hydroperoxide, pinane hydroperoxide, and the like, is added, after which the reaction mixture is heated at temperatures of about 50° C. to 150° C. until the copolymerization has been carried to the desired extent. Bulk polymerization procedures may be used in which the reagents are simply heated together in a closed vessel, or the polymerization can be carried out in an organic solvent, such as dioxane, toluene, or other armoatic hydrocarbon solvent known in the art to be suitable for this purpose.

The presence of water-soluble material in the aqueous solution of the salts of the copolymers is not excluded. For example, cooked starch may be employed to further enhance the properties which are imparted by the resin without losing any advantages afforded by the copolymers of the invention.

Suitable di-substituted organic sulfides which may be utilized in preparing the ternary sulfonium salt of the ar-haloalkyl radical on the ring of vinyl aromatic units in the copolymer are those of the formula

wherein $R^6$ and $R^7$ are substituents selected from the group consisting of alkyl radicals of 1–6 carbon atoms, aryl, aralkyl and alkaryl radicals. Illustrative compounds are such as dimethyl sulfide, methyl ethyl sulfide, diethyl sulfide, dipropyl sulfide, dibenzyl sulfide, di-tertiary butyl sulfide, methyl butyl sulfide, ditolyl sulfide, ditoluyl sulfide, ethyl hexyl sulfide, ethyl toluene sulfide, and the like.

In preparing the sulfonium salt, the sulfide, preferably in excess of an equal molar ratio, based on the amount of ar-haloalkyl substituted styrene, is employed although amounts even less than equal molar quantity of the sulfide compound may be sufficient. In general, quantities of the sulfide compound to ar-haloalkyl substituted styrene in the copolymer in a molar ratio of from about 0.8:1 to about 2.0:1, respectively, may be used. Larger relative quantities of the sulfide may be used but no particular advantage accrues thereby.

The temperature employed in the reaction of the copolymer and the sulfide may vary from about room temperature to reflux. It is preferred that temperatures in the range of from about 40° C. to about 80° C. be employed.

The sulfonium salt prepared from the copolymer according to the invention may be represented by the general formula

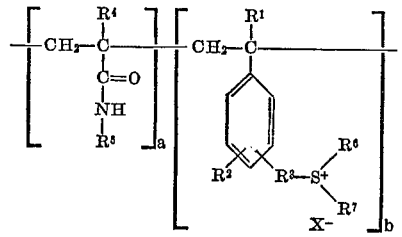

wherein $R^1$ through $R^7$ and X have the values hereinabove defined, and the mole ratio of $a$ to $b$ is from about 99:1 to about 5:95, respectively.

From a practical standpoint, it is sometimes desirable to dissolve the polymer salt in a mixture of a water and water-miscible solvent before adding additional water to dilute the mixture further. The addition of small amounts, i.e., generally of water-miscible organic solvent does not interfere with the use of those copolymers and frequently improves solubility in water. Frequently by adding these small amounts of solvents, the copolymers of the invention are rendered more soluble and of greater utility than would be the case if the water-miscible or-ganic solvent were omitted. Water-miscible organic solvents for this purpose are such as dioxane, dimethyl formamide, butyl cellusolve, ethyl cellusolve, or various water-miscible alcohols and ketones.

The molecular weights of the copolymers are not critically important, inasmuch as water-soluble products are obtainable over a wide range of molecular weights. The more useful properties are obtained when the copolymers have attained molecular weights of at least 10,000 although it will be understood that the resins produced by the above-described processes ordinarily have molecular weights substantially higher than this minimum and usually within the range of about 50,000 to 800,000 and even higher.

It will be seen, therefore, that the linear carbon chain polymers used in preparing the cationic sulfonium salts of the invention are the copolymerizates of (a) polymerizable ar-substituted vinyl aromatic, which substituents are halogenated alkyl radicals of 1 to 2 carbon atoms, and (b) acrylamido monomers copolymerizable with (a). All or part of the halogens in the vinyl aromatic alkyl group in the straight chain copolymer are converted to salt groups by reacting the copolymers with (c) the sulfides of the general formula hereinbefore described.

Because of their water solubility, these resinous ternary sulfonium salts can be economically applied to surfaces. They have been found to confer unusually good soil conditioning properties to soil, good dry strength properties to paper substrates to which they have been applied, and are excellent corrosion inhibitors for metals when used in metal treating baths.

In order that the present invention may be more fully understood, the following examples are set forth for purposes of illustration only, and any specific enumeration of details should not be interpreted as a limitation, except as expressed in the appended claims. Parts expressed are parts by weight, unless otherwise stated.

*Example 1*

32 parts (0.45 mole) of acrylamide and 7.6 parts (0.05 mole) of chloromethylstyrene were brought to reflux in 200 ml. of acetone and treated with 1.45 parts (0.006 mole) benzoyl peroxide. After refluxing for 3 hours, the precipitated polymer was collected by filtration and air dried. 10 parts of the product is dissolved in 300 parts of water and treated with 1.35 parts (0.015 mole) of diethyl sulfide. The coreactants are heated at 50–60° C. for 6 hours. After this time a sample of the solution obtained as a reaction product gave a positive chloride ion test with silver nitrate. The product is composed of recurring units of the formula

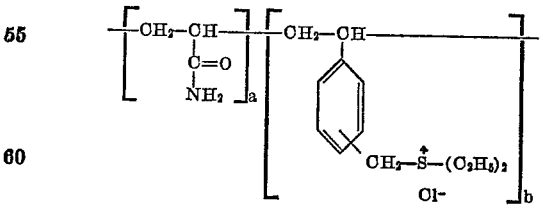

and having a mole ratio of $a$ to $b$ of about 9:1.

*Example 2*

38.7 parts of methacrylamide and 7.6 parts of chloromethylstyrene are copolymerized as in Example 1. The copolymeric product is then reacted with 1.5 parts of methyl ethyl sulfide.

*Example 3*

32 parts of acrylamide and 7.6 parts of chloromethylstyrene are copolymerized as in Example 1. The copolymeric product is then reacted with 0.93 part of dimethyl sulfide.

Example 4

28.4 parts of acrylamide and 15.2 parts of chloromethylstyrene are copolymerized as described in Example 1. The product is then reacted with 2.7 parts of diethyl sulfide.

Example 5

28.4 parts of N-tert. butyl acrylamide and 15.2 parts of chloromethylstyrene are copolymerized as in Example 1 and the polymeric product is then reacted with 21.4 parts of dibenzyl sulfide.

Example 6

21.3 parts of dodecyl acrylamide, 15.2 parts of chloromethylstyrene and 8.88 parts of methyl acrylate are copolymerized with 1.2 parts of azobisisobutyronitrile. The product is then reacted with 6.06 parts of diethyl sulfide.

Example 7

10 parts of the copolymer of methacrylamide and ar-bromomethylstyrene prepared according to the procedure of Example 1 are dissolved in water and reacted with 1.35 parts of diethyl sulfide.

In each of the examples hereinabove, a positive halogen ion test is obtained with silver nitrate.

The products obtained from Examples 1 to 7 are very effective metal corrosion inhibitors in amounts of from about 0.1 to about 3% based on the weight of solution when used in metal treating baths. The sulfonium copolymeric salt apparently forms a monomolecular layer on the metal. The products herein prepared are also useful in the selective separation of ores in ore settling operations.

We claim:

1. A water-soluble linear chain cationic resinous composition comprising the sulfonium salt of a copolymer of (a) from about 1 to about 95 mole percent of a compound of the general formula

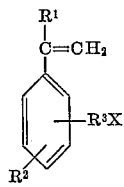

wherein $R^1$ and $R^2$ are substituents selected from the group consisting of hydrogen, halogen, methyl and ethyl radicals, $R^3$ is a substituent selected from the group consisting of methylene and ethylene radicals, and X is a halogen atom, and (b) from about 5 to about 99 mole percent of a compound of the general formula $$CH_2=C-CON-H$$
$$\phantom{CH_2=C-C}|\phantom{ON}|$$
$$\phantom{CH_2=C-C}R^4\phantom{O}R^5$$

wherein $R^4$ is a substituent selected from the group consisting of hydrogen, halogen and methyl radicals and $R^5$ is a substituent selected from the group consisting of hydrogen and alkyl radicals having 1 to 20 carbon atoms, with a sulfide selected from the group consisting of compounds of the formula

wherein $R^6$ and $R^7$ are substituents selected from the group consisting of alkyl radicals of 1 to 6 carbon atoms, aryl radicals, alkaryl radicals and aralkyl radicals, the amount of sulfide compound to component (a) of the copolymer being in a molar ratio of from about 0.8:1 to about 2.0:1.

2. A water-soluble linear chain cationic resinous composition comprising the sulfonium salt of a copolymer of (a) from about 1 to about 95 mole percent of a compound of the general formula

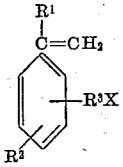

wherein $R^1$ and $R^2$ are substituents selected from the group consisting of hydrogen, halogen, methyl and ethyl radicals, $R^3$ is a substituent selected from the group consisting of methylene and ethylene radicals, and X is a halogen atom, and (b) from about 5 to about 99 mole percent of acrylamide with a sulfide selected from the group consisting of compounds of the formula

wherein $R^6$ and $R^7$ are substituents selected from the group consisting of alkyl radicals of 1–6 carbon atoms, aryl radicals, alkaryl radicals and aralkyl radicals, the amount of sulfide compound to component (a) of the copolymer being in a molar ratio of from about 0.8:1 to about 2.0:1.

3. A water-soluble linear chain cationic resinous composition comprising the sulfonium salt of a copolymer of (a) from about 1 to about 95 mole percent of ar-(chloromethyl)styrene and (b) from about 5 to about 99 mole percent of acrylamide with a sulfide selected from the group consisting of compounds of the formula

wherein $R^6$ and $R^7$ are substituents selected from the group consisting of alkyl radicals of 1–6 carbon atoms, aryl radicals, alkaryl radicals and aralkyl radicals, the amount of sulfide compound to component (a) of the copolymer being in a molar ratio of from about 0.8:1 to about 2.0:1.

4. A water-soluble copolymeric composition comprising recurring units of the formula

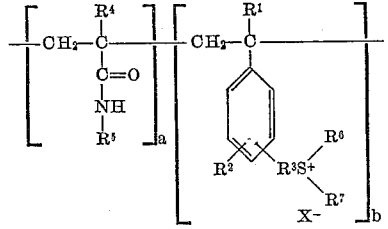

wherein $R^1$ and $R^2$ are substituents selected from the group consisting of hydrogen, halogen, methyl and ethyl radicals; $R^3$ is a substituent selected from the group consisting of methylene and ethylene radicals; $R^4$ is a substituent selected from the group consisting of hydrogen, halogen and methyl radicals; $R^5$ is a substituent selected from the group consisting of hydrogen and an alkyl radical of 1–20 carbon atoms; $R^6$ and $R^7$ are substituents selected from the group consisting of alkyl radicals of 1–6 carbon atoms, aryl radicals, alkaryl radicals and aralkyl radicals; and X is a halogen atom, and the mole ratio of a to b is from about 99:1 to about 5:95, respectively.

5. A water-soluble copolymeric composition comprising recurring units of the formula

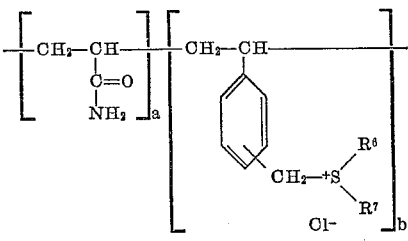

wherein $R^6$ and $R^7$ are substituents selected from the group consisting of alkyl radicals of 1–6 carbon atoms, aryl radicals, alkaryl radicals and aralkyl radicals, and the mole ratio of $a$ to $b$ is from about 99:1 to about 5:95, respectively.

6. A water-soluble copolymeric composition comprising recurring units of the formula

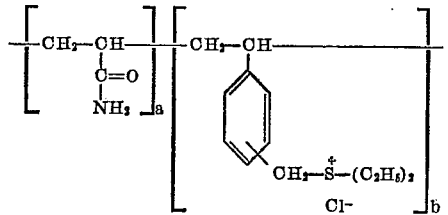

wherein the mole ratio of $a$ to $b$ is from about 99:1 to about 5:95, respectively.

References Cited in the file of this patent

UNITED STATES PATENTS

| | | |
|---|---|---|
| 2,780,604 | Clarke et al. | Feb. 5, 1957 |
| 2,895,925 | Hwa | July 21, 1959 |